United States Patent Office 3,661,896
Patented May 9, 1972

3,661,896
AZATRICYCLIC LACTAMS
Gilbert H. Berezin, West Chester, Pa., assignor to E. I. du Pont de Nemours and Company, Wilmington, Del.
No Drawing. Division and Continuation-in-part of application Ser. No. 775,114, Nov. 12, 1968. This application Aug. 21, 1970, Ser. No. 66,097
Int. Cl. C07d 41/00
U.S. Cl. 260—239.3
2 Claims

ABSTRACT OF THE DISCLOSURE

This invention relates to the novel compounds 4-azatricyclo[4.3.1.1$^{3,8}$]undecane - 5 - one and 4 - azatricyclo [5.3.1.1$^{3,9}$]dodecane-5-one and the methods of preparing said compounds.

CROSS REFERENCE TO RELATED APPLICATIONS

This application is a division and continuation-in-part of my co-pending application Ser. No. 775,114, filed Nov. 12, 1968.

SUMMARY OF THE INVENTION

This invention is directed to azatricyclic compounds which are useful as intermediates in the preparation of pharmaceutically active compounds.

In particular this invention is directed to compounds of the following formulae:

and

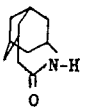

DESCRIPTION OF THE INVENTION

This invention is based on the discovery that 4-azatricyclo[4.3.1.1$^{3,8}$]undecane - 5 - one and 4 - azatricyclo [5.3.1.1$^{3,9}$]dodecane-5-one, respectively can be employed in the preparation of 4-azatricyclo[4.3.1.1$^{3,8}$]undecane-4 - carboxamide and 4 - azatricyclo[4.3.1.1$^{3,9}$]dodecane-4-carboxamide which latter compounds are useful as antiviral agents. My copending application, Ser. No. 775,114, contains detailed examples of the antiviral activity of the above named carboxamides. This disclosure and all other disclosures of said application not expressly set forth herein is hereby incorporated by reference for a more complete understanding of my invention.

Preparation.—The compounds of this invention can be prepared as set forth in the following examples.

EXAMPLE 1

Adamantanone oxime

To a solution of 90 g. (1.29 moles) of hydroxylamine hydrochloride and 145 g. (1.06 moles) of sodium acetate trihydrate in 450 ml. (0.60 mole) of water, there is added 90 g. of adamantanone in 50 ml. of ethanol. When the reaction mixture thickens, it is diluted with 200 ml. of water and stirred overnight. At the end of this period the solid is filtered and washed with water. Recrystallization of the solid from ether gives adamantanone oxime, M.P. 166–167° C.

The preparation of adamantanone oxime is also reported in G. W. Smith and H. D. Williams, J. Org. Chem. 26, 2207 (1961).

EXAMPLE 2

4-azatricyclo[4.3.1.1$^{3,8}$]undecane-5-one

To a solution of 30 g. (0.18 mole) of adamantanone oxime in 360 ml. of a 20% solution sodium hydroxide in water, there is added 50 g. (0.28 mole) of benzenesulfonyl chloride with vigorous stirring at 20–30° C. The temperature is held at less than 30° C. with an ice bath until no further exothermic tendency is noted. The temperature of the reaction is raised to 55° C. and held at 55° C. for two hours with vigorous stirring. At the end of this period the solution is almost clear. The solution is cooled and extracted with three 600 ml. portions of chloroform. The chloroform solution is dried with anhydrous magnesium sulfate, filtered and evaporated at reduced pressure. The residual solid is recrystallized from hexane to give 4-azatricyclo[4.3.1.1$^{3,8}$]undecane-5-one, M.P. 309–310° C.

Analysis.—Calcd. for $C_{10}H_{15}NO$ (percent): C, 72.7; H, 9.15; N, 8.48. Found (percent): C, 72.9; H, 9.25; N, 8.43.

EXAMPLE 3

4-azatricyclo[4.3.1.1$^{3,8}$]undecane hydrochloride

To 12 gm. (0.07 mole) of 4-azatricyclo[4.3.1.1$^{3,9}$]undecane-5-one dissolved in 400 ml. of tetrahydrofuran, there is added 8 g. (0.21 mole) of lithium aluminum hydride. The solution is stirred and heated at reflux for 18 hours in a nitrogen atmosphere and is then cooled to 0° C. A 20% sodium hydroxide solution is added cautiously until the salts precipitate. The tetrahydrofuran solution is decanted and the salts are washed with an additional 100 ml. of tetrahydrofuran. The combined tetrahydrofuran solution is dried with anhydrous magnesium sulfate, filtered and evaporated at reduced pressure. The residual oil is steam distilled into hexane. The hexane solution is dried with anhydrous magnesium sulfate and is then filtered. Anhydrous hydrogen chloride gas is passed into the hexane solution until precipitation of a white solid is complete. The white solid is filtered and recrystallized from ethanol to give 4-azatricyclo[4.3.1.1$^{3,9}$]undecane hydrochloride, M.P. 300° C.

Analysis.—Calcd. for $C_{10}H_{17}N \cdot HCl$ (percent): C, 64.2; H, 9.58; N, 7.46; Cl, 18.9. Found (percent): C, 64.6; H, 9.82; N, 7.5; Cl, 18.7.

EXAMPLE 4

4-azatricyclo[4.3.1.1$^{3,8}$]undecane-4-carboxamide

To 2 g. (0.011 mole) of 4-azatricyclo[4.3.1.1$^{3,8}$]undecane hydrochloride dissolved in 10 ml. of water, there is added 1 g. (0.012 mole) of potassium cyanate at 60° C. The solution is heated on a steam bath for thirty minutes and then allowed to cool. A white solid precipitates and is filtered. The solid is recrystallized from 100 ml. of water. The white needles are dried for 18 hours in a vacuum drying pistol containing $P_2O_5$ at 60° C. to give 4-azatricyclo[4.3.1.1$^{3,9}$]undecane - 4-carboxamide, M.P. 126–127° C.

EXAMPLE 5

Tricyclo[4.3.1.1$^{3,8}$]undecane-4-one oxime

To a solution of 30 g. (0.43 mole) of hydroxylamine hydrochloride and 48 g. (0.35 mole) of sodium acetate trihydrate in 150 ml. of water, there is added 30 g. of tricyclo[4.3.1.1$^{3,8}$]undecane-4-one in 50 ml. of ethanol. An additional 100 ml. of water is added and the mixture stirred at room temperature for an additional eighteen hours. The solid precipitate is filtered and washed with water. The solid is air dried and recrystallized from ether-pentane to give tricyclo[4.3.1.1$^{3,8}$]undecane-4-one oxime, M.P. 150–152° C.

*Analysis.*—Calcd. for $C_{11}H_{17}NO$ (percent): C, 73.8; H, 9.51; N, 7.85. Found (percent): C, 74.07; H, 9.56; N, 8.41.

EXAMPLE 6

4-azatricyclo[5.3.1.1$^{3,9}$]dodecane-5-one

To 240 ml. of 20% sodium hydroxide solution is added, with stirring, 22 g. (0.12 mole) of tricyclo[4.3.1.1$^{3,8}$]undecane-5-one oxime. To this well stirred solution is added 36 g. (0.20 mole) of benzenesulfonyl chloride. The reaction is controlled at 25–30° C. with an ice bath until the exothermic reaction subsides. The reaction mixture is then heated to 55° C. for one hour. At the end of the heating period the solution is almost clear. The reaction mixture is cooled and extracted with three 300 ml. portions of chloroform. The chloroform is filtered, dried over anhydrous magnesium sulfate and evaporated. The residual solid is recrystallized from heptane to give 4-azatricyclo [5.3.1.1$^{3,9}$]dodecane-5-one, M.P. 233–235° C. decomp.

*Analysis.*—Calcd. for $C_{11}H_{17}NO$ (percent): C, 73.8; H, 9.51; N, 7.85. Found (percent): C, 73.6; H, 9.67; N, 7.85.

EXAMPLE 7

4-azatricyclo[5.3.1.1$^{3,9}$]dodecane amine hydrochloride

To a suspension of 8 g. (0.21 mol) of lithium aluminum hydride in 300 ml. of tetrahydrofuran, there is added, at 25° C. in a nitrogen atmosphere, 12 g. (0.667 mole) of 4-azatricyclo[5.3.1.1$^{3,9}$]dodecane-5-one dissolved in 200 ml. tetrahydrofuran. The resulting mixture is stirred and heated at reflux in a nitrogen atmosphere for 48 hours. At the end of this period the mixture is cooled to 0° C. and 20% sodium hydroxide solution is added to precipitate the salts. The tetrahydrofuran solution is decanted and evaporated at reduced pressure. The residual oil is steam distilled into hexane. The hexane solution is dried with anhydrous magnesium sulfate and is then filtered. Anhydrous hydrogen chloride gas is pasesd into the hexane solution until precipitation of a while solid is complete. The solid is then recrystallized from ethanol ether to give 4-azatricyclo[5.3.1.1$^{3,9}$]dodecane amine hydrochloride, M.P. 300° C.

*Analysis.*—Calcd. for $C_{11}H_{19}N \cdot HCl$ (percent): C, 65.5; H, 9.95; N, 6.95; Cl, 17.6. Found (percent): C, 65.5; H, 10.09; N, 6.82; Cl, 17.3.

EXAMPLE 8

4-azatricyclo[5.3.1.1$^{3,9}$]dodecane-4-carboxamide

To 4 g. (0.02 mole) of 4-azatricyclo[5.3.1.1$^{3,9}$]dodecane hydrochloride dissolved in 10 ml. of water, there is added 1.5 g. (0.017 mole) of potassium cyanate at 60° C. The solution is heated on a steam bath for thirty minutes and then allowed to cool. A white solid precipitates and is filtered. The solid is recrystallized from 100 ml. of water and is then dried for 18 hours in a vacuum drying pistol containing $P_2O_5$ at 60° C. to give 4-azatricyclo [5.3.1.1$^{3,9}$]dodecane-4-carboxamide, M.P. 166–168° C.

*Analysis.*—Calcd. for $C_{12}H_{20}N_2O$ (percent): C, 6.92; H, 9.62; N, 13.4.

The adamantane starting material employed in Example 7 above can be prepared as taught in U.S. Pat. No. 3,257,456.

The tricyclo[4.3.1.1$^{3,8}$]undecane-4-one starting material employed in Example 5 above can be prepared as described in the following examples.

EXAMPLE 9

To a well stirred solution of 0.1 mole adamantanone dissolved in 75 ml. of methanol, there is added 0.30 mole of concentrated sulfuric acid at a rate that causes the solution to reflux. To this refluxing solution is added a saturated aqueous solution containing 0.60 mole of sodium cyanide. The resulting solution is heated at reflux for one hour. The solution is stirred for an additional three hours at room temperature. At the end of this period, 200 ml. of ether is added to the solution. The ether solution is decanted from the precipitated salts and extracted with two 50 ml. portions of saturated sodium chloride solution. The ether solution is dried with anhydrous magnesium sulfate. The solution is filtered and the ether is removed at reduced pressure to give a tan solid. The solid is recrystallized from methyl cyclohexane to give adamantane cyanohydrin, M.P. 257–259° C. (decomp).

EXAMPLE 10

To a suspension of 0.13 mole lithium aluminum hydride in 200 ml. of ether, is added with vigorous stirring at reflux 0.028 mole of adamantanone cyanohydrin dissolved in 100 ml. of ether. The mixture is heated at reflux for 6 hours and then allowed to cool to room temperature. Stirring is continued overnight. At the end of this period, the mixture is cooled to −5° C. with an ice-acetone bath. To the cooled reaction mixture is added 30% aqueous sodium hydroxide until the salts precipitate. The ether solution is filtered and dried over potassium hydroxide pellets. The ether is filtered and evaporated at reduced pressure to give 2-aminomethyl-2-adamantanol as a white solid. The compound when recrystallized from cyclohexane gives white plates, M.P. 124–126° C.

*Analysis.*—Calcd. for $C_{11}H_{19}NO$ (percent): C, 74.6; H, 8.50; N, 7.90. Found (percent): C, 74.9; H, 8.47; N, 8.00.

The amine hydrochloride is prepared by dissolving 2-aminomethyl-2-adamantanol in a mixture of 50% tetrahydrofuran and 50% ether. Anhydrous hydrogen chloride gas is then introduced into this solution to precipitate the amine hydrochloride. The white precipitate is recrystallized for methanol-ether to give white plates, M.P.>300° C.

*Analysis.*—Calcd. for $C_{11}H_{19}NO \cdot HCl$ (percent): C, 60.7; H, 9.2; N, 6.4; Cl, 16.3. Found (percent): C, 61.2; H, 9.6; N, 6.5; Cl, 16.0.

EXAMPLE 11

To a 1300 ml. stainless steel bomb, there is added 45 g. of spiro[oxirane-2,2'-tricyclo(3.3.1.1$^{3,7}$)]undecane, 800 ml. of 28% ammonium hydroxide solution and 60 g. of ammonia. The bomb is sealed and the reaction mixture is heated to 120° C. for three hours with shaking. The bomb is cooled and the contents decanted. The aqueous solution containing a tan solid is diluted to 2 liters with water and heated to reflux. The boiling solution is filtered, concentrated to 800 ml. and cooled to 0° C. in an ice bath. The glistening white plates that precipitate are filtered, pressed dry and recrystallized from cyclohexane to give 2-aminomethyl-2-adamantanol indentical in all respects to that obtained from adamantanone cyanohydrin.

EXAMPLE 12

To a well-stirred solution of 0.54 mole of 2-aminomethyl-2-adamantanol in 520 ml. of glacial acetic acid and 1040 ml. of water, there is added at 0° C. 1.24 moles of sodium nitrite dissolved in 174 ml. of water. The reaction mixture is stirred vigorously for 1 hour at 0° C. and allowed to come to room temperature with continued vigorous stirring. During this period, a white precipitate forms. The slurry is cooled to 0° C. and made basic (pH-9) by the addition of solid sodium hydroxide. The cold slurry is filtered and the collected solid sodium is washed with water until the washes are neutral. The solid is steam distilled into hexane to give tricyclo(4.3.1.1$^{3,8}$)undecane-4-one, M.P. 258–260 (sealed tube). Molecular weight; calcd. 164.1201; found 164.1206 (by mass spec.).

$CH_2Cl_2$ max 3050, 1700, 1455, 1357, 1175, 1080 cm.$^{-1}$

*Analysis.*—Calcd. for $C_{11}H_{16}O$ (percent): C, 80.6; H, 9.7. Found (percent): C, 80.9; H, 9.7.

I claim:
1. A compound of the formula:
2. A compound of the formula:
References Cited
UNITED STATES PATENTS
3,257,456  6/1966  Smith _____ 260—586
3,560,481  2/1971  Berzin _____ 260—239
HENRY R. JILES, Primary Examiner
R. T. BOND, Assistant Examiner
U.S. Cl. X.R.
260—586 R, 556 A, 563, 464, 348 C, 239 D, 999